May 12, 1970  H. E. STULLER ET AL  3,510,969
HYDRAULIC DRIVE FOR SCRAPER ELEVATOR
Filed July 31, 1967  3 Sheets-Sheet 1
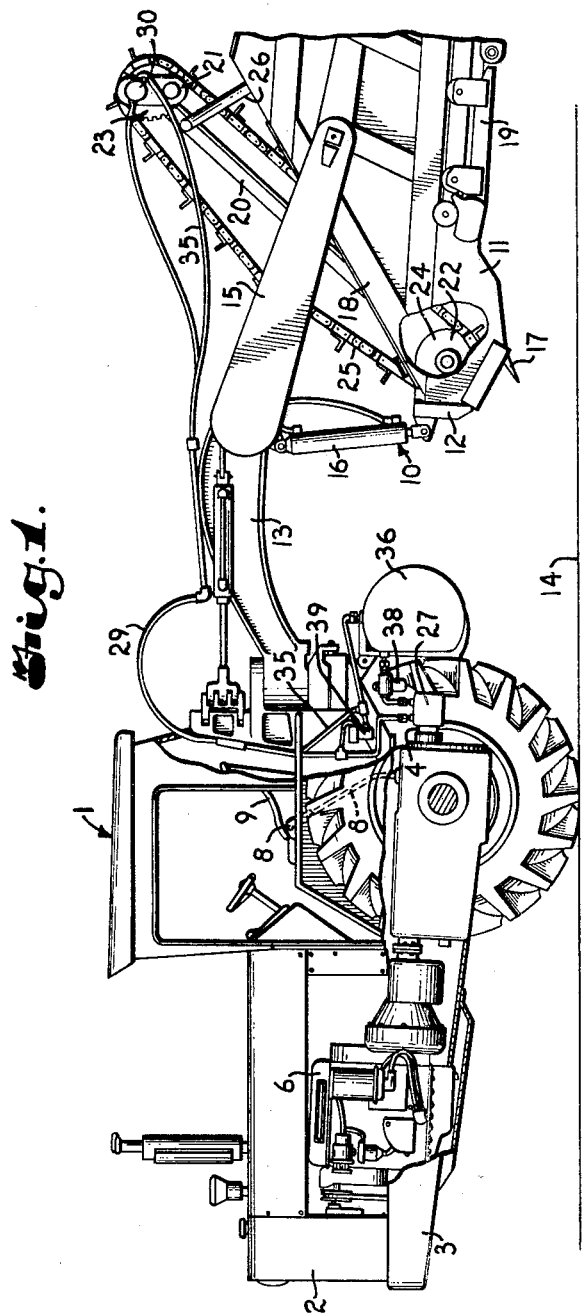
INVENTORS.
HOWARD E. STULLER,
WERNER P. GOLDKUHLE and
BY TALMADGE A. STEPHENSON
Fishburn, Gold & Litman
ATTORNEYS

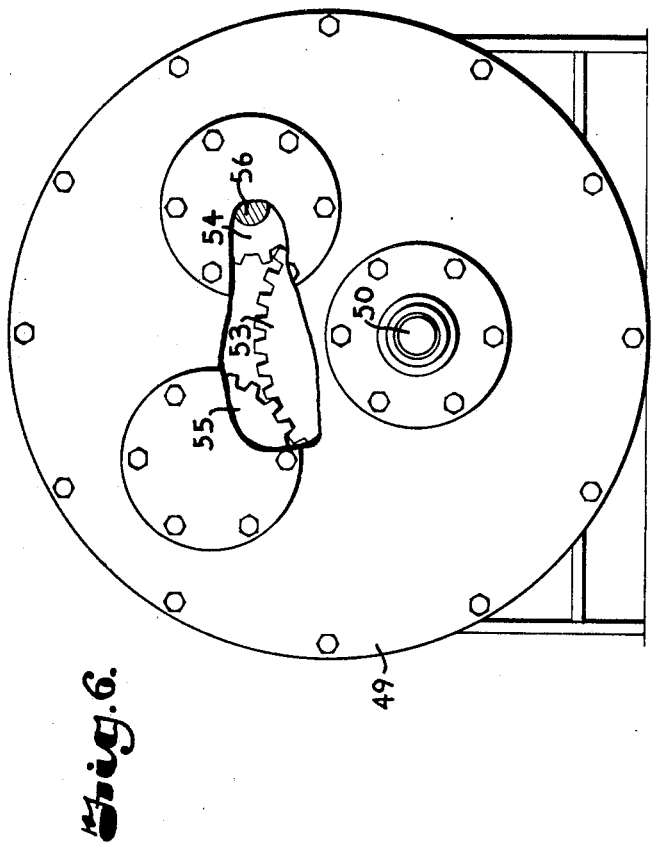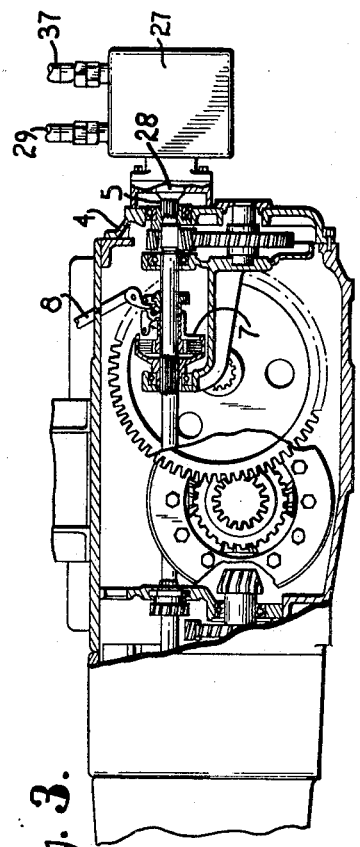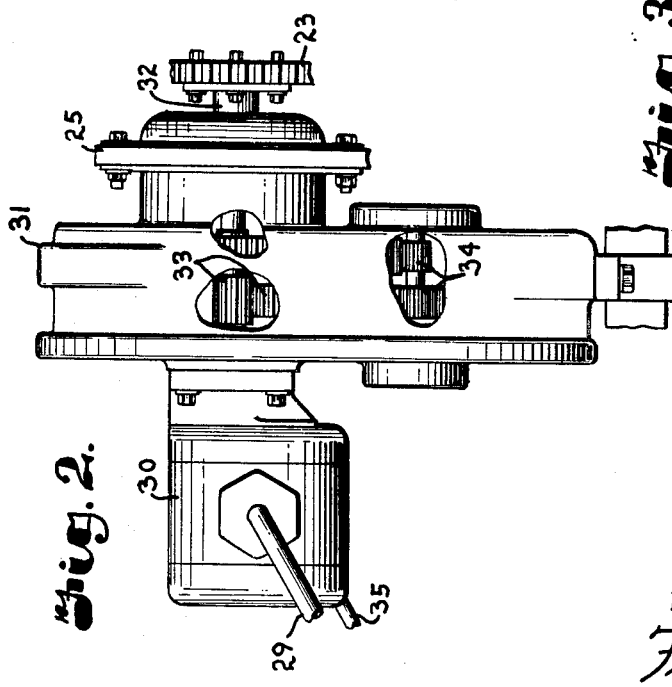

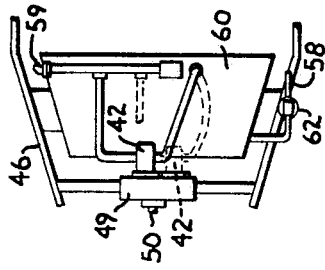
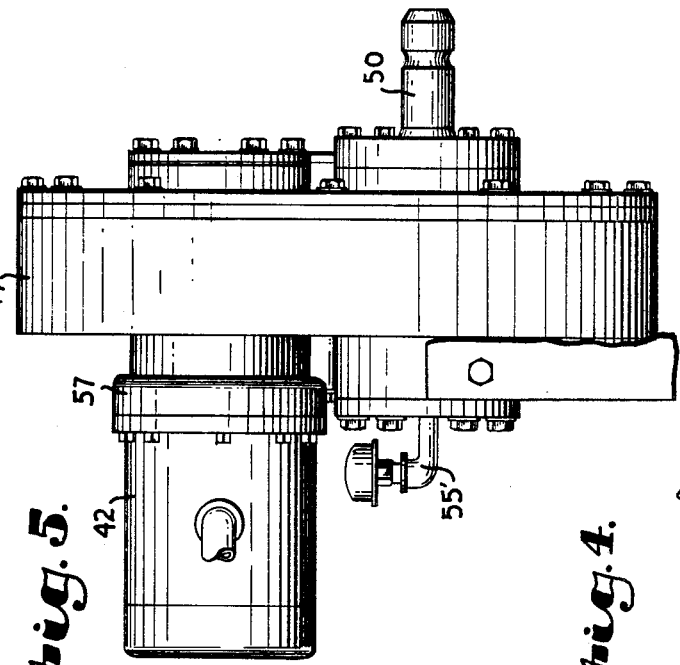
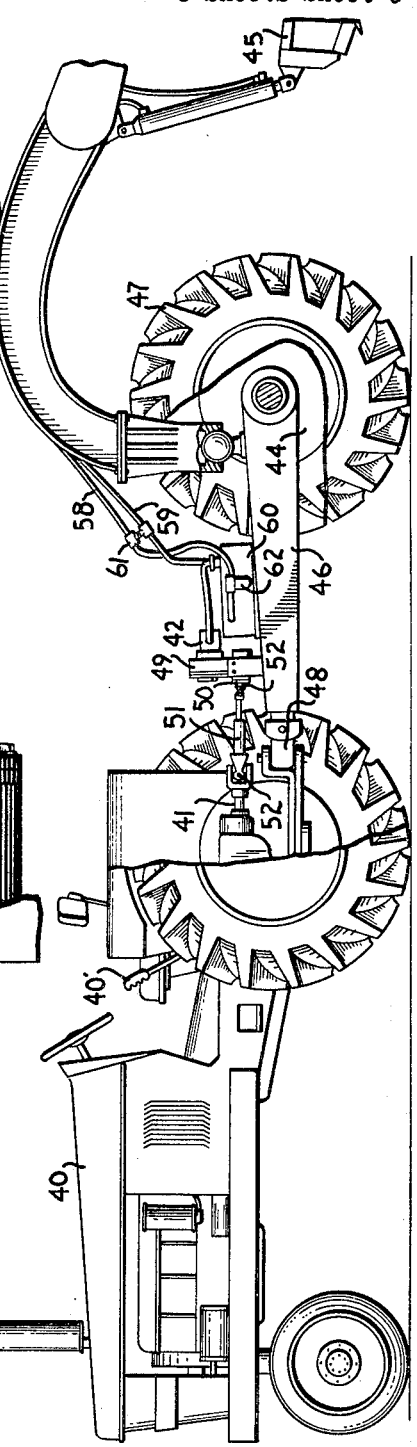

United States Patent Office 3,510,969
Patented May 12, 1970

3,510,969
HYDRAULIC DRIVE FOR SCRAPER ELEVATOR
Howard E. Stuller, Werner P. Goldkuhle, and Talmadge A. Stephenson, Lubbock, Tex., assignors to Clark Equipment Company, Buchanan, Mich., a corporation of Michigan
Filed July 31, 1967, Ser. No. 657,361
Int. Cl. B60p 1/36
U.S. Cl. 37—8                                     1 Claim

ABSTRACT OF THE DISCLOSURE

A high torque hydraulic motor is mounted on the frame of a tractor drawn elevating scraper conveyor for driving the conveyor, hydraulic fluid to the motor being directly supplied through an unobstructed hose by an hydraulic pump connected to the power take-off unit of the tractor whereby the power take-off control efficiently operates the scraper conveyor. A gear train may be inserted between the power take-off unit and the hydraulic pump when it is desirable to modify the power take-off rotation speed with respect to the input speed of the pump.

---

This invention relates to earth moving equipment and, more particularly, to scrapers of the type having an elevating conveyor to aid in moving dirt into a collecting box.

Elevating conveyors for tractor drawn scrapers are normally driven by the tractor through a complex and relatively fragile mechanical system of gears, telescoping shafts, universal joints, angular drives and, at times, transmission belts. Torque limiting devices are often used in such mechanical systems to prevent major damage in case of conveyor overload, however, such devices themselves are very susceptible to damage and tend to cause frequent, expensive down-time.

Although the use of hydraulic motors for driving elevating scraper conveyors has been suggested (U.S. Pat. No. 3,143,814), such hydraulic motors were driven through hoses connected to the regular hydraulic system of the tractor. This presents certain disadvantages, among which are a tendency to exceed the normal supply capacity of the system, the presence of a control valve in the system which produces a pressure drop in the hydraulic fluid supply to the conveyor motor, and the inability of the hydraulic pump to be easily disengaged when not needed to prevent parasitic power loss. Further, such hydraulic systems tend to add substantially to the torque load on the engine starting motor, particularly in cold weather.

This invention contamplates operably connecting an hydraulic pump to the existing power take-off system of the tractor for driving an hydraulic conveyor motor, whereby the pump is controlled through the usual power take-off clutch members and the pump may thus become pletely and easily disconnected from the tractor engine when not needed to drive the conveyor motor.

It is the principal objects of the present invention to provide earth moving scrapers wherein the elevating conveyor is hydralically driven through a pump connected to the mechanical power take-off of the tractor; to provide such structure which permits a direct fluid connection between the hydraulic pump and the hydraulic motor, i.e., without a fluid control valve in the circuit; to provide such apparatus which eliminates much of the expensive and relatively fragile mechanical linkage between the tractor engine and the elevating conveyor without losing advantags thereof; to provide such a system wherein the hydraulic pump may be completely disconnected from the tractor engine when not needed by existing mechanical controls; to provide such elevating conveyor drive apparatus which is easily adapted for use with either two-wheeled or four-wheeled tractors; and to provide such drive apparatus which is simple in construction while being reliable and convenient in use.

Other objects and advantages of this invention will become apparent from the following description taken in connection with the accompanying drawings wherein are set forth by way of illustration and example certain embodiments of this invention.

FIG. 1 is a side elevational, fragmentary view showing an elevating scraper using a two-wheeled tractor and incorporating the hydraulic drive of this invention.

FIG. 2 is a fragmentary end elevation showing an hydraulic motor and gear reduction unit by which the elevating conveyor is driven.

FIG. 3 is a fragmentary view on an enlarged scale with portions broken away showing the power take-off system and control therefor in the tractor of FIG. 1.

FIG. 4 is a fragmentary side elevational view showing a somewhat modified form of this invention used with a four-wheeled tractor system including a scraper dolly.

FIG. 5 is a fragmentary side elevation on an enlarged scale showing a speed increasing transmission for use with the four-wheeled tractor of FIG. 4 to increase the rotational input speed to the hydraulic pump.

FIG. 6 is a front elevational view of the speed increaser of FIG. 5 with a portion broken away showing alternate output gears therein.

FIG. 7 is a plan view showing the speed increasing transmission and indicating alternate mounts for the pump.

Referring to the drawings in more detail:

The reference numeral 1 generally indicates earth moving scraper apparatus embodying this invention. The apparatus 1 comprises a two-wheeled tractor 2 of the type which includes the Model 282 Tractor Unit produced by the Hancock Division, Clark Equipment Company, Lubbock, Tex., and having a frame 3 and an auxiliary power-drive system 4 commonly known as a "power take-off." The power take-off 4 includes an auxiliary power drive shaft 5 extending rearwardly of the tractor frame and adapted for connection to a variety of auxiliary equipment which may be used with the tractor. The drive shaft 5 is driven by the tractor engine 6 through a mechanically operated clutch 7 controlled by a lever 8 which extends into a position convenient for movement by the operator who sits in a suitable seat 9. By moving the lever 8 between predetermined positions, the drive shaft 5 is easily engaged and disengaged from the engine 6.

The apparatus 1 includes an earth receiving and moving vehicle 10 having a mobile frame 11 with a front end 12. The vehicle 10, for example, is of the type known as a Model 282 Elevating Scraper Unit produced by the Hancock Division, Clark Equipment Company, Lubbock, Tex. Supporting draft structure 13 connects the vehicle 10 to the tractor 2 for pulling the vehicle over the ground 14 during scraping and transport. Arms 15 are pivotally mounted at the rear ends thereof to the frame 11 and are rigidly secured at the front ends thereof to the draft structure 13, forming the draft connection to the frame 11. Hydraulic cylinders 16 are mounted at opposite ends to the frame 11 and to the rigid connection between the draft structure 13 and arms 15 for remotely controlling, through the regular hydraulic system of the tractor 2, the height of the front end 12 above the ground 14. When the front end 12 is lowered sufficiently, a scraper blade 17 digs into the ground 14 for gathering dirt to be hauled to a different location. The scraper blade 17 is mounted on the vehicle frame 11 adjacent the front end 12 and extends transversely thereof. A dirt collecting open front box 18 is mounted on the frame 11 rearwardly of the scraper blade for receiving the dirt. Suitable dirt unloading structure 19 communicates with the box interior for selectively dumping the load gathered therein.

An inclined conveyor frame 20 has an upper end 21 and a lower end 22. Sprockets 23 and idler rollers 24 are rotatably mounted on the conveyor frame 20 at said upper and lower ends and a scraper type endless conveyor 25 is moveably engaged with the sprockets and rollers for endless motion on an inclined plane extending upwardly and rearwardly of the tractor 2. A support arm 26 is pivotally mounted on the vehicle frame 11 and also pivotally supports the conveyor frame 20 at the upper end 21, permitting the conveyor frame lower end 22 to move in a vertical plane toward and away from the scraper blade 2. The conveyor 25 is thereby adapted to urge dirt, accumulating above the scraper blade 17, upwardly and rearwardly into the dirt collecting box 18 with a minimum expenditure of power.

In practicing this invention an hydraulic pump 27 is operably mounted with respect to the tractor frame 3 and has the input drive member 28 thereof connected to the auxiliary power drive-shaft 5. An unobstructed flexible hydraulic hose 29, forming the output from the pump 27, is directly connected to the input of an hydraulic motor 30 of a relatively high speed type which is mounted on a gear reduction unit 31 secured to the conveyor frame 20. The unit 31 has an output shaft 32 operably connected to the sprockets 23 for driving the conveyor 25. The hydraulic motor 30, in this example, is of the vane type offered by the Vickers Division of Sperry Rand Corporation, Troy, Mich., 45M Series. The gear reduction unit 31 utilizes meshing gear sets 33 and 34 to obtain the desirable speed and torque at the output shaft 32. The hydraulic fluid out-flow from the motor 30 is carried by an unobstructed return hose 35 to an hydraulic fluid storage tank 36 which, in this example, constitutes a separate reservoir associated with the fuel tank of the tractor 2. The storage tank 36 is connected through a hose 37 to the input of the pump 27, the flow passing through a suitable fluid filter 38 to keep the hydraulic fluid clean.

Thus, when the conveyor 25 is to be operated, the lever 8 is moved to engage the clutch 7 whereupon the power take-off shaft 5 is rotated, driving the pump 27. This forces hydraulic fluid under high pressure directly into the hydraulic motor 30 causing the conveyor to move with the conveyor frame sprockets. Should the conveyor become jammed, or some other malfunction occur which abnormally raises the input fluid pressure to the motor 30, the hydraulic fluid in the output hose 29 is relieved in pressure through a safety valve 39 which shunts a portion of the fluid, as required, directly into the return line 35. Upon securing a load in the dirt collecting box 18, the lever 8 may again be moved completely disengaging the above described hydraulic system from the tractor engine 6, whereupon power otherwise lost may be used for hauling the load to a desired location for spreading or dumping.

A modified form of this invention is illustrated in FIGS. 4, 5 and 6 and relates to the use of this concept on a four-wheeled tractor 40. The tractor 40 is of the type which is less specialized than the tractor 2. The power take-off system has a clutch operated by a lever 40′ for controlling an output drive shaft 41 extending rearwardly of the tractor which is driven at different average speeds, depending upon the make and model of the tractor. Common speeds of typical drive shafts of this type are 1000 r.p.m. and 540 r.p.m. Since the hydraulic pump 42 may be required to have an input speed at substantial variance with these drive shaft speeds, a speed converter is used between the pump 42 and the shaft 41 In this example, the pump 42 should be driven at an average speed of 2100 r.p.m. for efficient operation to power the hydraulic motor 43 driving the elevator conveyor.

In the use of conventional four-wheeled tractors, it is sometimes necessary to use a scraper dolly 44 to properly support the substantial front end load of the earth moving vehicle 45. The scraper dolly 44 includes a draft tongue 46 which extends between supporting wheels 47 and the draft connection 48 at the rear of the tract or 40. The tongue 46 forms a convenient platform on which to mount a speed converter 49 referred to above. The converter 49 has an input shaft 50 which connects to a telescoping drive shaft 51 which in turn connects to the power take-off drive shaft 41, each end of the telescoping drive shaft 51 being supplied with universal connecting joints 52.

The converter 49 contains a main gear 53 (FIG. 6) rotated directly by the input shaft 50 and which meshes simultaneously with a pair of output gears 54 and 55. A breather 55′ prevents excessive pressure build-up in the converter case. The output gear 54 has a tooth ratio with the gear 53 whereby the output shaft 56 thereof, which connects to the pump 42, is driven at the required 2100 r.p.m. The output gear 55 however, has such a tooth ratio with the gear 53, that a speed of the input shaft 50 of 1000 r.p.m. will produce an output speed of the shaft driven by the output gear 55 of the required 2100 r.p.m. The transmission 49 is supplied with a suitable cover 57 which is adapted to selectively cover the output shaft associated with either the gear 54 or 55 depending upon which speed power take-off shaft is found on the tractor 40. The pump 42 is simply shifted to the desired position when mounted on the converter 49, FIG. 7.

The output of the pump 42 is supplied directly to the motor 43 through an hydraulic hose 58 and hydraulic fluid return is achieved through a hose 59 communicating into a tank 60 which, in this example, is also mounted on the dolly tongue 46, and in close association with the pump 42. A suitable high pressure by-pass valve 61 and filter 62 are provided for the reasons noted above in connection with the first described embodiment.

What we claim and desire to secure by Letters Patent is:
1. Earth moving apparatus comprising a tractor having an engine, a frame and an auxiliary power drive shaft, a clutch operably connected between the tractor engine and said drive shaft for selectively driving and disengaging said shaft,
 (a) an earth moving vehicle having a mobile frame with a front end, draft means connecting said vehicle to said tractor for pulling said vehicle, a scraper blade mounted on the vehicle frame adjacent the front end, a dirt collecting open front box mounted on said frame rearwardly of said scraper blade,
 (b) an elevating conveyor mounted on said vehicle frame and adapted, when driven, to move dirt from said scraper blade into said dirt collecting box,
 (c) an hydraulic pump having an input drive member operably connected to said drive shaft, speed converting means operably mounted between said auxiliary power drive shaft and said pump input drive member, said speed converting means including a main gear driven by said power drive shaft, a plurality of gears of varying pitch meshing with said main gear, and means for selectively connecting said pump input drive member to one of said plurality of gears to selectively vary the speed ratio between said power drive shaft and said pump input drive member,
 (d) an hydraulic motor operably connected to said conveyor for driving said conveyor, and hydraulic fluid containing hoses operably connected between said pump and motor, whereby said clutch controls the operation of said conveyor through the control of said pump.

References Cited

UNITED STATES PATENTS

| | | |
|---|---|---|
| 1,749,274 | 3/1930 | Crisler. |
| 2,054,497 | 8/1936 | McCollum. |
| 2,851,896 | 9/1958 | Ordway _____ 74—15.6 XR |
| 2,883,866 | 4/1959 | Harkleroad _____ 74—11 |
| 3,208,165 | 9/1965 | Johnson et al. _____ 37—8 |
| 3,274,711 | 9/1966 | Johnson et al. _____ 37—8 |
| 3,296,715 | 1/1967 | Jass et al. _____ 37—8 |
| 3,331,149 | 7/1967 | Rapp _____ 37—8 |
| 3,077,835 | 2/1963 | Wiggermann _____ 103—4 |
| 3,168,043 | 2/1965 | Wiggermann _____ 103—42 |
| 3,188,964 | 6/1965 | Batten _____ 103—4 |
| 3,335,672 | 8/1967 | Raymond _____ 103—4 |
| 3,426,456 | 2/1969 | Keith et al. _____ 37—8 |

ROBERT E. PULFREY, Primary Examiner

E. H. EICKHOLT, Assistant Examiner

U.S. Cl. X.R.

37—129